US006968466B2

(12) United States Patent
Bolian et al.

(10) Patent No.: US 6,968,466 B2
(45) Date of Patent: Nov. 22, 2005

(54) REMOTE METHOD FOR CONTROLLING POWER ON AN INFORMATION HANDLING SYSTEM

(75) Inventors: Albert J. Bolian, Round Rock, TX (US); Jinsaku Masuyama, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 509 days.

(21) Appl. No.: 10/255,302

(22) Filed: Sep. 26, 2002

(65) Prior Publication Data
US 2004/0064743 A1    Apr. 1, 2004

(51) Int. Cl.[7] .............................. G06F 1/26; G06F 1/32; G05F 5/00
(52) U.S. Cl. ...................... 713/300; 713/320; 323/299; 323/271
(58) Field of Search ........................................ 713/300

(56) References Cited

U.S. PATENT DOCUMENTS

| | | | |
|---|---|---|---|
| 5,251,320 A | * | 10/1993 | Kuzawinski et al. ........ 713/324 |
| 5,708,819 A | * | 1/1998 | Dunnihoo .................... 713/323 |
| 2002/0004912 A1 | * | 1/2002 | Fung ........................... 713/300 |

OTHER PUBLICATIONS

Jinsaku Masuyama, Jeremey J. Pionke, "System and Method for Autonomous Power Sequencing" US Patent Application.
Jinsaku Masuyama, Mukund P. Khatri, "Computer System with Improved Data Capture System" U.S. Patent Application.
Scott M. Ramsey, Michael W. Kolb, Jinsaku Masuyama, "System and Method for Using a Shared Bus for Video Communications" U.S. Patent Application.
Manoj Gujarathi "Using IT Assistant to Manage Blade Servers" PowerSolutions Aug. 2002, pp. 21-24.
Mike Roberts "System Environment" PowerSolutions Mar. 2002, pp. 110-112.

* cited by examiner

*Primary Examiner*—Lynne H. Browne
*Assistant Examiner*—Stefan Stoynov
(74) *Attorney, Agent, or Firm*—Hamilton & Terrile, LLP; Stephen A. Terrile

(57) ABSTRACT

An apparatus for remotely controlling the power of an information handling system which includes a power supply, an input output (I/O) controller, a power button coupled to the I/O controller and a power management controller coupled to the I/O controller. The power management controller receives a power command signal and generates a remote power signal based upon the power command signal. The remote power signal controls the power supply via the I/O controller.

25 Claims, 4 Drawing Sheets

REMOTE METHOD FOR CONTROLLING POWER ON AN INFORMATION HANDLING SYSTEM

BACKGROUND OF THE INVENTION

1. Field of the Invention

The present invention relates to the field of information handling systems, and more particularly to remotely controlling power to an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a server blade. A server blade is a server on a card. The card includes a single motherboard that contains a full computer system, including a processor(s), memory, network connections, and associated electronics. Most server blades include some level of local disk storage with provisions to access external storage. Each server blade runs its own instance of the operating system; consequently, administrators can designate individual blades for different applications or end users and can insert or remove (hot plug) the server blades without affecting the operation of other server blades. Multiple server blades plug into the midplane of a chassis, or enclosure, that provides shared, redundant infrastructure components such as power, cooling, networking, and cabling.

Known server blade platforms provide the ability for remote chassis administration via a single management card that communicates to each of the blades in a chassis (e.g., an Embedded Server Management card). Among many of the remote management capabilities that the ESM card provides is the ability to power down a server blade. The server blade may also be powered down by actuating a power button 125 on the server blade. The ESM card powers down a server blade by sending a command to a super SIO (SIO) controller 110 on the server blade. The SIO controller controls whether power from the power supply 120 is applied to the server blade or not. However, simply removing power to the server blade by the SIO controller 110 remotely may introduce data corruption issues if the ESM card instructs the SIO controller 110 to remove power while an operating system is running. (See, e.g., FIG. 1, labeled Prior Art.)

SUMMARY OF THE INVENTION

In accordance with the present invention, an information handling system is provided with the ability for remote power management via a power management controller which receives power signals and controls the power supply of the information handling system based upon the power signals.

In one embodiment, the invention relates to an apparatus for remotely controlling the power of an information handling system which includes a power supply, an input output (I/O) controller, a power button coupled to the I/O controller and a power management controller coupled to the I/O controller. The power management controller receives a power command signal and generates a remote power signal based upon the power command signal. The remote power signal controls the power supply via the I/O controller.

In another embodiment, the invention relates to an information handling system which includes a processor, memory coupled to the processor, and a power management system coupled to the processor. The power management system includes a power supply, an input output (I/O) controller, a power button coupled to the I/O controller, and a power management controller coupled to the I/O controller. The power management controller receives a power command signal and generates a remote power signal based upon the power command signal. The remote power signal controls the power supply via the I/O controller.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
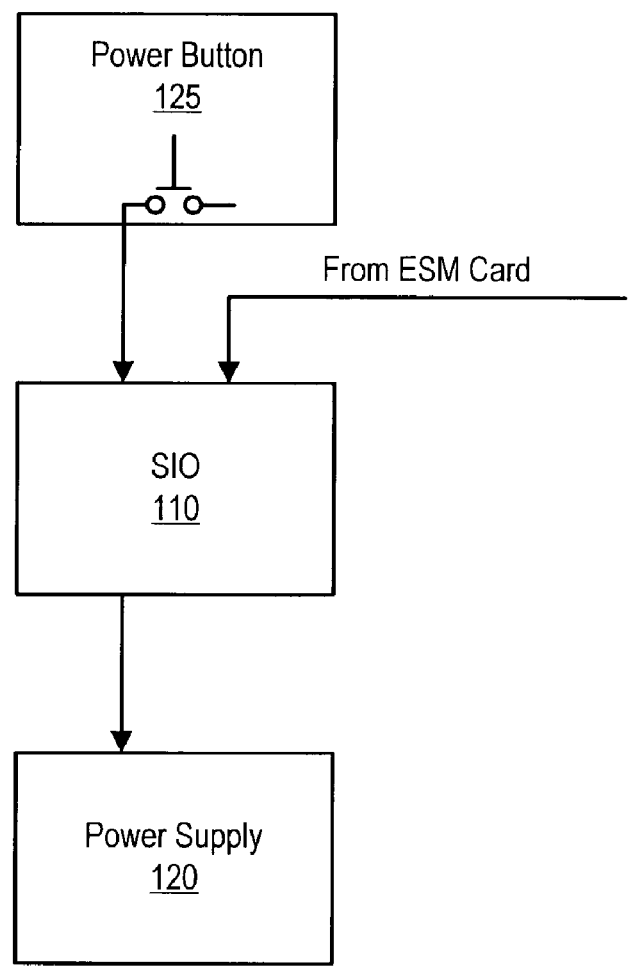
FIG. 1, labeled as prior art, shows a schematic block diagram of a known server blade power management system.
Figure 2A:
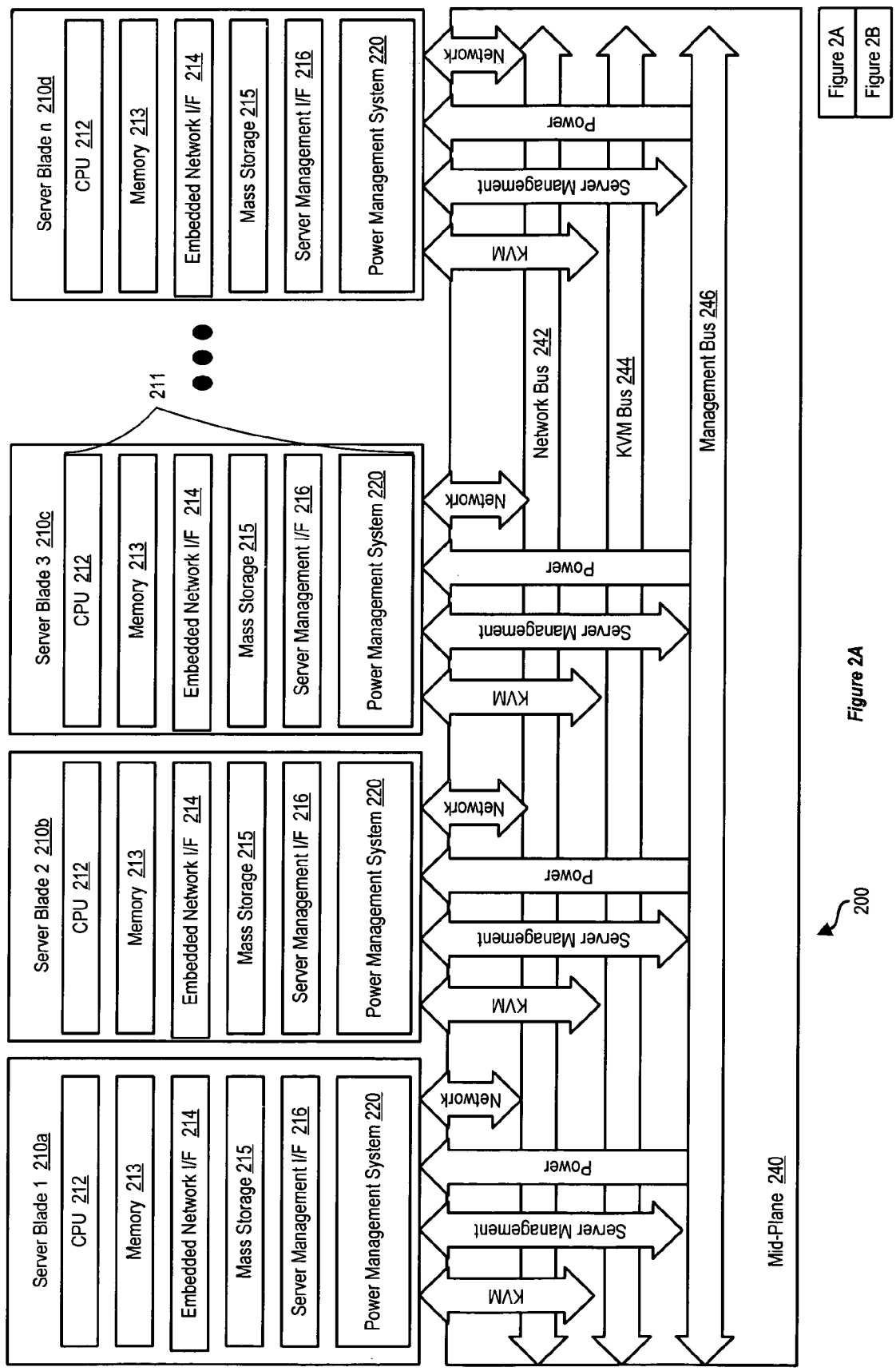
FIGS. 2A and 2B (generally referred to as FIG. 2) show a schematic block diagram of a server blade platform.
Figure 2B:
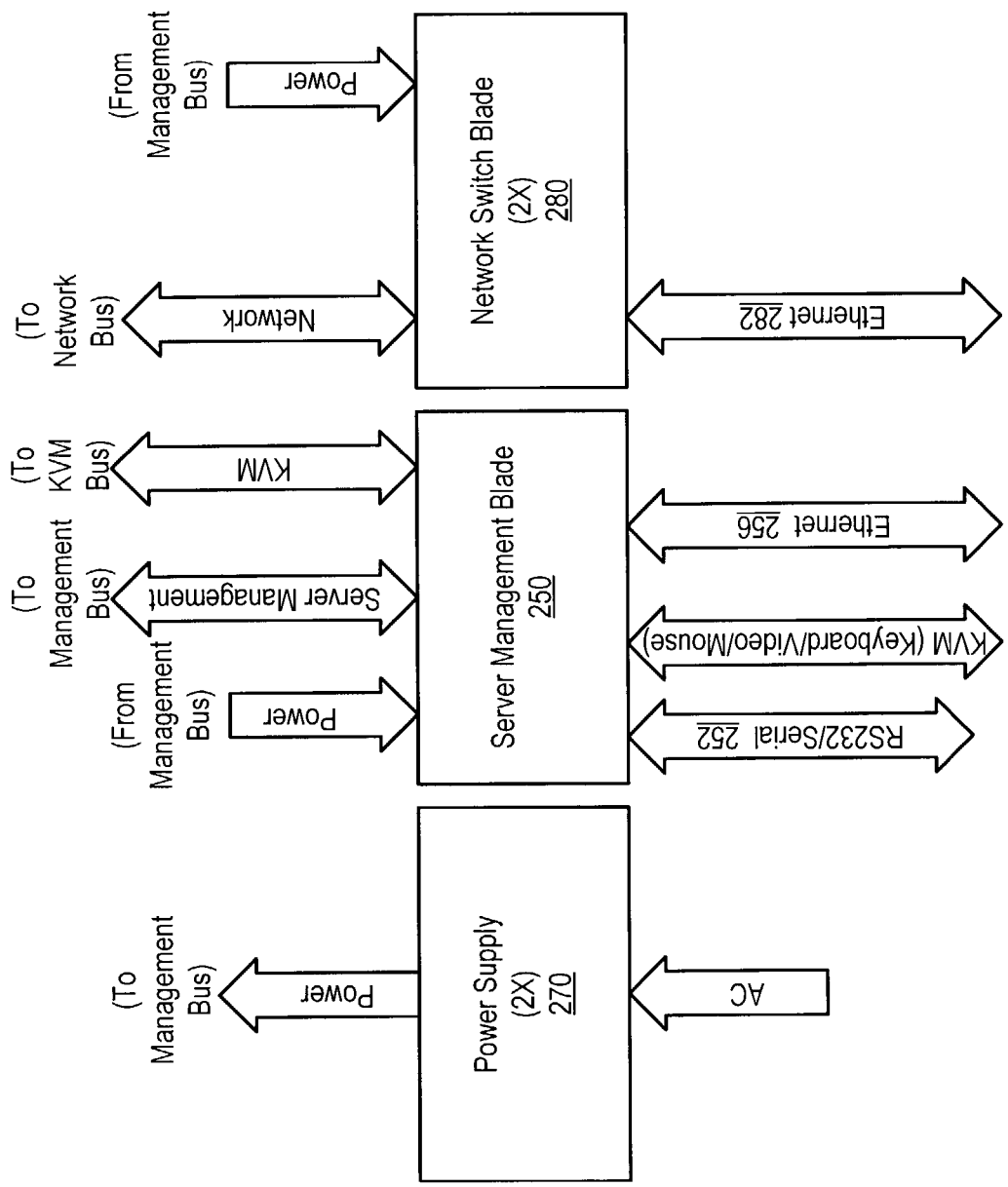

Referring to FIG. 2, a block diagram of a server blade system 200 is shown. Such a system includes a plurality of sub-systems 210a, 210b, 210c and 210d. Each sub-system 210 is an independent computer system, such as a personal computer or a server blade. Usually only the system boards of these computers or servers are used and placed into a rack or tower system. Every sub-system 210 includes respective components 211, such as a central processing unit (CPU) 212, memory 213, embedded network interface 214, mass storage device 215, and server management interface 216. Usually only one keyboard, mouse and monitor (not shown) is coupled with a keyboard-mouse-monitor managing unit (not shown) which selectively couples the keyboard-mouse-monitor managing unit with one of the sub-systems.

Each server blade 210 also includes a respective server blade power management system 220. Each server blade power management system 220 enables a corresponding server blade 210 to be individually and remotely power on or off. The power management system 220 provides a user with the same effect as a user pushing a mechanical power button located at the front of the server. The functionality of the power management system 220 is compliant with the Microsoft ACPI specification. The ACPI functionality includes remote power on/off, remote hard shutdown and remote hard shutdown/reboot. The behavior of the power management system 220 when receiving the remote button signal depends upon the operating system executing on the server blade 210. When the server blade is executing an operating system that does not support remote shutdown capability, the server blade simply powers off (or powers on) when receiving the remote button signal.

The server blades 210 are coupled to a mid plane 240 which is located within, e.g., a rack or tower. The mid-plane 240 includes a network bus 242, a keyboard-video-mouse (KVM) bus 244 and a management bus 246. Each server blade 210 is coupled to the mid-plane 240 via these buses.

The server blade system 200 also includes a server management blade 250. The server management blade 250 is coupled to the mid-plane 240 and more specifically to the network bus 242, the KVM buss 244 and the management bus 246. The server management blade 250 also includes a serial port 252, e.g, an RS232 port, a KVM port 254 and an Ethernet port 256.

The server blade system 200 also includes a plurality (e.g., 2) of power supplies 270 as well as a plurality (e.g., 2) of network switch blades 280. The power supplies 270 are coupled to an AC power source and provide power to the server blade system 200 via the management bus 246. The network switch blades 280 are coupled to the network bus 242 and include an Ethernet port 282.

Figure 3:
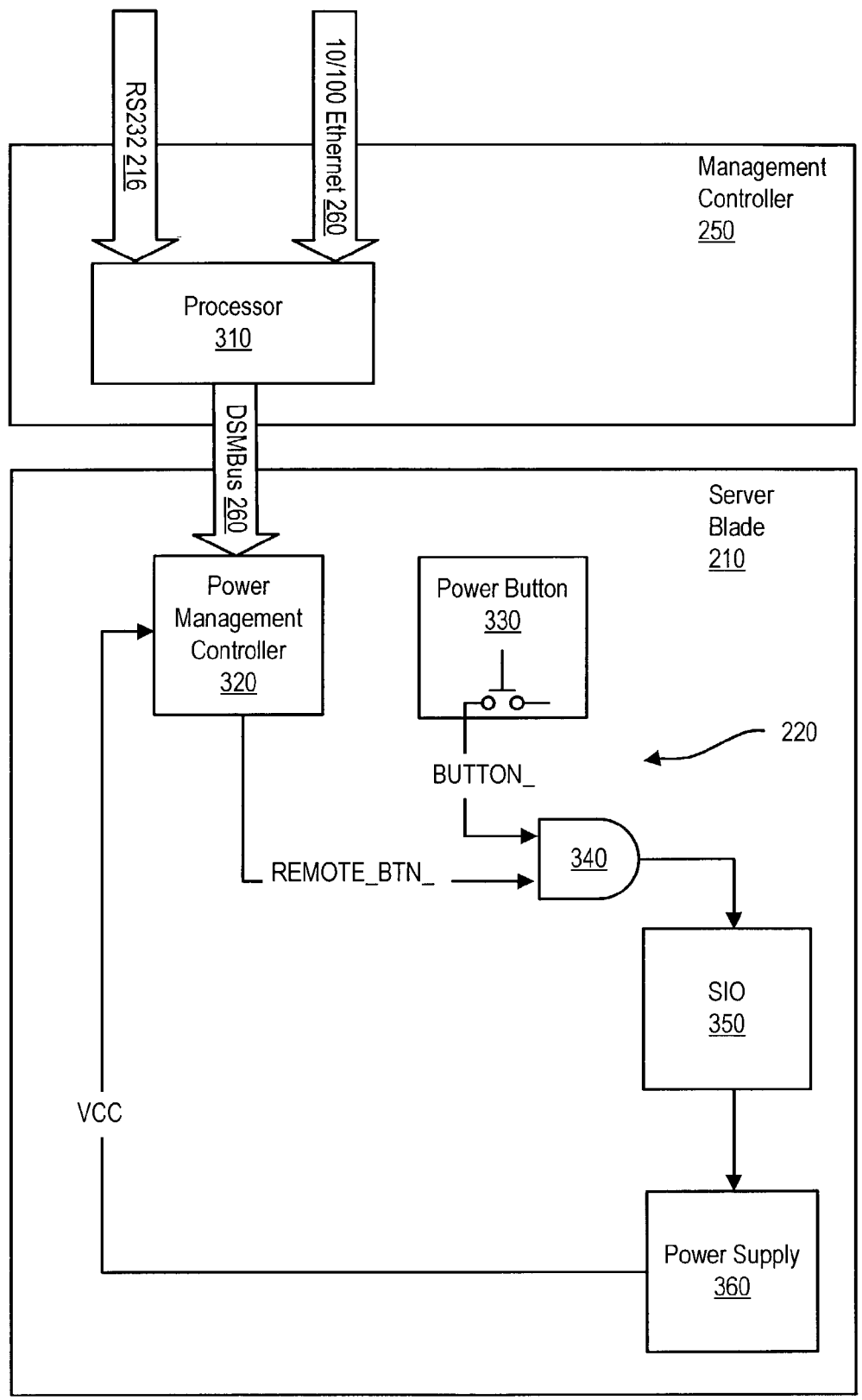
FIG. 3 shows a schematic block diagram of a server blade power management system.

Referring to FIG. 3, the management controller 250 includes a processor 310 which communicates with the power management system 220 of each server blade 210. Each power management system 220 includes a power management controller 320 and a power button 330 each of which are coupled to a logic gate 340, e.g., an AND gate which in turn is coupled to a super I/O controller 350. The super I/O controller 350 is coupled to the power supply 360 of the server blade 210.

The power management controller 320 monitors the VCC signal. Also, the power management controller 320 accesses a bit which indicates the last known power state of the server blade 210. This bit is saved (e.g., in non-volatile memory within the server blade 210) every time the mechanical power button of the server blade 210 or the remote button is activated.

The power management controller 320 is configured to provide a remote power signal under a variety of conditions. More specifically, if the VCC signal is present (i.e., if the power supply is powered on), then the power management controller 320 ignores a power on command from the management controller 250. If the VCC signal is not present (i.e., if the power supply is not powered on), then the power management controller 320 ignores a shutdown or emergency power off command from the management controller. If the management controller 250 provides a shutdown command to the power management controller 320 and the power supply 360 is powered on, then the power management controller 320 asserts the remote power signal for a first predetermined amount of time (e.g., for 100 mSec.). If the management controller 250 provides an emergency power off command to the power management controller 20 and the power supply 360 is powered on, then the power management controller 320 asserts the remote power signal for a second predetermined amount of time (e.g., for 5 seconds). If the management controller 250 provides a power on command and if the VCC signal is not present, then the power management controller 320 asserts the remote power signal for a first predetermined amount of time.

The first predetermined amount of time is set to mimic the actuation of the power button. The second predetermined amount of time is long enough to cause the system to shut down even of the operating system of the server blade 210 is locked up.

Accordingly, the power management controller 320 sends a signal to the power button input of the blade's super I/O controller 350 instead of simply removing power from the system. Asserting the remote power signal simulates a power button being pressed by a local user. An advanced configuration and power interface (ACPI) aware operating systems notes the power button is being pressed and perform a graceful shutdown and power off of the server blade 210. The graceful shutdown depends upon the operating system that is executing on the server blade 210.

Additionally, the power management controller 320 provides for the condition in which the operating system of the server blade 210 does not respond to the power button notification. The power management controller 320 samples the power state of the server blade 210 and if the server blade 210 does not respond to the initial power button 320 actuation, the power management controller 320 reasserts the power button signal, this time keeping it asserted for a predetermined amount of time, e.g., five seconds. More specifically, once a remote shutdown is activated, the power management controller 320 monitors the server blade power. If the power is not removed within a defined time, the power management controller 320 asserts the five-second override. The power management controller 320 mimics pressing a mechanical power button for five seconds. The super I/O controller 350 notes this five-second override, and then powers down the server blade 210.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while three server blades 210 are shown, any number of server blades are contemplated.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. An apparatus for remotely controlling the power of an information handling system comprising
    a power supply;
    an input output (I/O) controller;
    a power button coupled to the I/O controller;
    a power management controller coupled to the I/O controller, the power management controller receiving a power command signal and generating a remote power signal based upon the power command signal, the remote power signal controlling the power supply via the I/O controller; and wherein
    the power management controller determines whether the power supply is powered on and if the power supply is powered off, the power management controller ignores power off command signal.

2. The apparatus of claim 1 wherein the power management controller determines whether the power supply is powered on and if the power supply is powered on, the power management controller ignores the power command signal.

3. The apparatus of claim 1 wherein the power management controller determines whether the power supply is powered on and if the power supply is powered on and the power management controller receives a power off signal, the power management controller asserts a remote power signal for a first predetermined amount of time.

4. The apparatus of claim 1 wherein the power management controller determines whether the power supply is powered on and if the power supply is powered off and the power management controller receives a power on signal, the power management controller asserts a remote power signal.

5. An apparatus for remotely controlling the power of an information handling system comprising
    a power supply;
    an input output (I/O) controller;
    a power button coupled to the I/O controller;
    a power management controller coupled to the I/O controller, the power management controller receiving a power command signal and generating a remote power signal based upon the power command signal, the remote power signal controlling the power supply via the I/O controller; and wherein
    wherein the power management controller determines whether the power supply is powered on and if the power supply is powered off, the power management controller ignores an emergency power off command signal.

6. The apparatus of claim 5 wherein the power management controller determines whether the power supply is powered on and if the power supply is powered on, the power management controller ignores the power command signal.

7. The apparatus of claim 5 wherein the power management controller determines whether the power supply is powered on and if the power supply is powered on and the power management controller receives a power off signal, the power management controller asserts a remote power signal for a first predetermined amount of time.

8. The apparatus of claim 5 wherein the power management controller determines whether the power supply is powered on and if the power supply is powered off and the power management controller receives a power on signal, the power management controller asserts a remote power signal.

9. An apparatus for remotely controlling the power of an information handling system comprising
    a power supply;
    an input output (I/O) controller;
    a power button coupled to the I/O controller;
    a power management controller coupled to the I/O controller, the power management controller receiving a power command signal and generating a remote power signal based upon the power command signal, the remote power signal controlling the power supply via the I/O controller; and wherein
    the power management controller determines whether the power supply is powered on and if the power supply is powered on and the power management controller receives an emergency shut down signal, the power management controller asserts a remote power signal for a second predetermined amount of time.

10. The apparatus of claim 9 wherein the power management controller determines whether the power supply is powered on and if the power supply is powered on, the power management controller ignores the power command signal.

11. The apparatus of claim 9 wherein the power management controller determines whether the power supply is powered on and if the power supply is powered on and the power management controller receives a power off signal, the power management controller asserts a remote power signal for a first predetermined amount of time.

12. The apparatus of claim 9 wherein the power management controller determines whether the power supply is powered on and if the power supply is powered off and the power management controller receives a power on signal, the power management controller asserts a remote power signal.

13. An information handling system comprising:
a processor;
memory coupled to the processor; and
power management system coupled to the processor, the power management system including
 a power supply;
 an input output (I/O) controller;
 a power button coupled to the I/O controller;
 a power management controller coupled to the I/O controller, the power management controller receiving a power command signal and generating a remote power signal based upon the power command signal, the remote power signal controlling the power supply via the I/O controller; and wherein
 the power management controller determines whether the power supply is powered on and if the power supply is powered off, the power management controller ignores power off command signal.

14. The information handling system of claim 13 wherein the power management controller determines whether the power supply is powered on and if the power supply is powered on, the power management controller ignores the power command signal.

15. The information handling system of claim 13 wherein the power management controller determines whether the power supply is powered on and if the power supply is powered on and the power management controller receives a power off signal, the power management controller asserts a remote power signal for a first predetermined amount of time.

16. The information handling system of claim 13 wherein the power management controller determines whether the power supply is powered on and if the power supply is powered off and the power management controller receives a power on signal, the power management controller asserts a remote power signal.

17. The information handling system of claim 13 wherein the information handling system includes a server blade.

18. An information handling system comprising:
a processor;
memory coupled to the processor; and
power management system coupled to the processor, the power management system including
 a power supply;
 an input output (I/O) controller;
 a power button coupled to the I/O controller;
 a power management controller coupled to the I/O controller, the power management controller receiving a power command signal and generating a remote power signal based upon the power command signal, the remote power signal controlling the power supply via the I/O controller; and wherein
 the power management controller determines whether the power supply is powered on and if the power supply is powered off, the power management controller ignores an emergency power off command signal.

19. The information handling system of claim 18 wherein the power management controller determines whether the power supply is powered on and if the power supply is powered on, the power management controller ignores the power command signal.

20. The information handling system of claim 18 wherein the power management controller determines whether the power supply is powered on and if the power supply is powered on and the power management controller receives a power off signal, the power management controller asserts a remote power signal for a first predetermined amount of time.

21. The information handling system of claim 18 wherein the power management controller determines whether the power supply is powered on and if the power supply is powered off and the power management controller receives a power on signal, the power management controller asserts a remote power signal.

22. An information handling system comprising:
a processor;
memory coupled to the processor; and
power management system coupled to the processor, the power management system including
 a power supply;
 an input output (I/O) controller;
 a power button coupled to the I/O controller;
 a power management controller coupled to the I/O controller, the power management controller receiving a power command signal and generating a remote power signal based upon the power command signal, the remote power signal controlling the power supply via the I/O controller; and wherein
 the power management controller determines whether the power supply is powered on and if the power supply is powered on and the power management controller receives an emergency shut down signal, the power management controller asserts a remote power signal for a second predetermined amount of time.

23. The information handling system of claim 22 wherein the power management controller determines whether the power supply is powered on and if the power supply is powered on, the power management controller ignores the power command signal.

24. The information handling system of claim 22 wherein the power management controller determines whether the power supply is powered on and if the power supply is powered on and the power management controller receives a power off signal, the power management controller asserts a remote power signal for a first predetermined amount of time.

25. The information handling system of claim 22 wherein the power management controller determines whether the power supply is powered on and if the power supply is powered off and the power management controller receives a power on signal, the power management controller asserts a remote power signal.

* * * * *